(12) United States Patent
Huang

(10) Patent No.: US 7,857,242 B2
(45) Date of Patent: Dec. 28, 2010

(54) QUICK CONNECTION DEVICE FOR ELECTRIC SPRAY GUN

(76) Inventor: Jung-Kun Huang, P.O. Box 44-2049, Taipei (TW) 10668

( * ) Notice: Subject to any disclaimer, the term of this patent is extended or adjusted under 35 U.S.C. 154(b) by 382 days.

(21) Appl. No.: 12/216,079

(22) Filed: Jun. 30, 2008

(65) Prior Publication Data

US 2009/0321670 A1 Dec. 31, 2009

(51) Int. Cl.
*B05B 1/00* (2006.01)
*B05B 7/02* (2006.01)
*A62C 11/00* (2006.01)
*A01G 25/14* (2006.01)

(52) U.S. Cl. .................. 239/600; 239/526; 239/333; 239/375; 239/583; 239/DIG. 14; 285/317; 403/325; 403/326; 403/327

(58) Field of Classification Search .................. 239/583, 239/375, 102.1, 102.2, 302, 378, 525, 526, 239/533.9, 390, 392, 600, DIG. 14, 320, 239/321, 333, 354, 359; 222/333, 183, 105, 222/107, 108; 285/317, 320, 308; 403/329, 403/DIG. 4, 325, 326, 327

See application file for complete search history.

(56) References Cited

U.S. PATENT DOCUMENTS

| | | | | |
|---|---|---|---|---|
| 6,631,855 | B2 * | 10/2003 | Huang | 239/526 |
| 6,805,306 | B1 * | 10/2004 | Huang | 239/375 |
| 2005/0251167 | A1 * | 11/2005 | Voegele et al. | 606/153 |

* cited by examiner

*Primary Examiner*—Len Tran
*Assistant Examiner*—Justin Jonaitis

(57) ABSTRACT

An electric spray gun includes a barrel having a positioning member received therein which includes two guide slots and two respective holes are defined through two sidewalls of the positioning member and communicate with the two guide slots. A cylinder is fixedly connected with a cover which is connected to a container and the cylinder is slidably connected to the positioning member. Two recesses are defined in two sides of the cylinder and two pawls are pivotably connected to the two sidewalls of the positioning member. Each pawl includes a first end and a second end, the first end of each pawl extends through the hole and engaged with the recess corresponding thereto. The first end can be pivoted out from the recess by pressing the second end of each of the pawls when the cylinder is slid in the guide slots.

7 Claims, 7 Drawing Sheets

QUICK CONNECTION DEVICE FOR ELECTRIC SPRAY GUN

BACKGROUND OF THE INVENTION (1) Field of the Invention

The present invention relates to an electric spray gun and more particularly, to a quick connection device for connecting the cylinder to the barrel.

(2) Description of the Prior Art

A conventional electric spray gun 1 is shown in FIG. 1 and generally includes container 2 connected to a cover 3 which is fixed to the barrel of the spray gun 1 and a cylinder is received in the barrel and includes a piston rod 8 which moves reciprocally to suck the paint in the container 2 and ejects the paint through a nozzle 11 on the front end of the barrel. An electromagnetic unit 5 is located in the barrel and drives a swing rod 6 to push the piston rod 8 and the distance that the piston rod 8 travels is able to be adjusted by adjusting the adjustment member 7. When pulling the trigger 10 of the spray gun 1, the electro-magnetic unit 5 is activated to drive the piston rod 8 to spray the paint from the nozzle 11. The cover 3 is fixed to the barrel by extending bolts 9 through the cover 4 and fixed to the board 12 on the underside of the barrel. However, the container 2 has to be cleaned up after each use and the user has to unscrew the bolts 9 to remove the container 2 from the barrel. It requires a hand tool and takes a lot of time to tighten or loosen the bolts 9.

Although some manufacturers develop quick release device for connecting the container 4 to he barrel, there is a gap between the container 3 and the barrel so that the container shakes during operation and the movement of the piston rod 8 cannot move smoothly.

The present invention intends to provide a connection device for easily connecting the cylinder to the barrel and the container can be threadedly connected to the cover which is integrally connected to the cylinder. The container can be easily connected to or remove from the cover and the container is securely positioned during operation of the spray gun.

SUMMARY OF THE INVENTION

The present invention relates to an electric spray gun which comprises a barrel having an electro-magnetic unit received therein so as to drive a swing rod to operate a piston rod of a cylinder. A positioning member is located at a front end of the barrel and includes two guide slots defined therein. Two respective holes are defined through two sidewalls of the positioning member and communicate with the two guide slots. The cylinder is fixedly connected with a cover and a container is removably connected to the cover. A piston rod is movably inserted in the cylinder and pushed by the swing rod so as to move reciprocally. Two recesses are defined in two sides of the cylinder and the two sides of the cylinder are slidably engaged with the two guide slots of the positioning member. The recesses of the cylinder are located corresponding to the holes of the positioning member. Two pawls are pivotably connected to the two sidewalls of the positioning member. Each pawl includes a first end and a second end. The first end of each pawl extends through the hole and engaged with the recess corresponding thereto. The first end is pivoted out from the recess by pressing the second end of each of the pawls. Two torsion springs are biased between the two pawls and the positioning member respectively. The second ends of the pawls can be pressed when the cylinder is slid in the guide slots when connecting the cylinder to the barrel.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENTS

Figure 1:
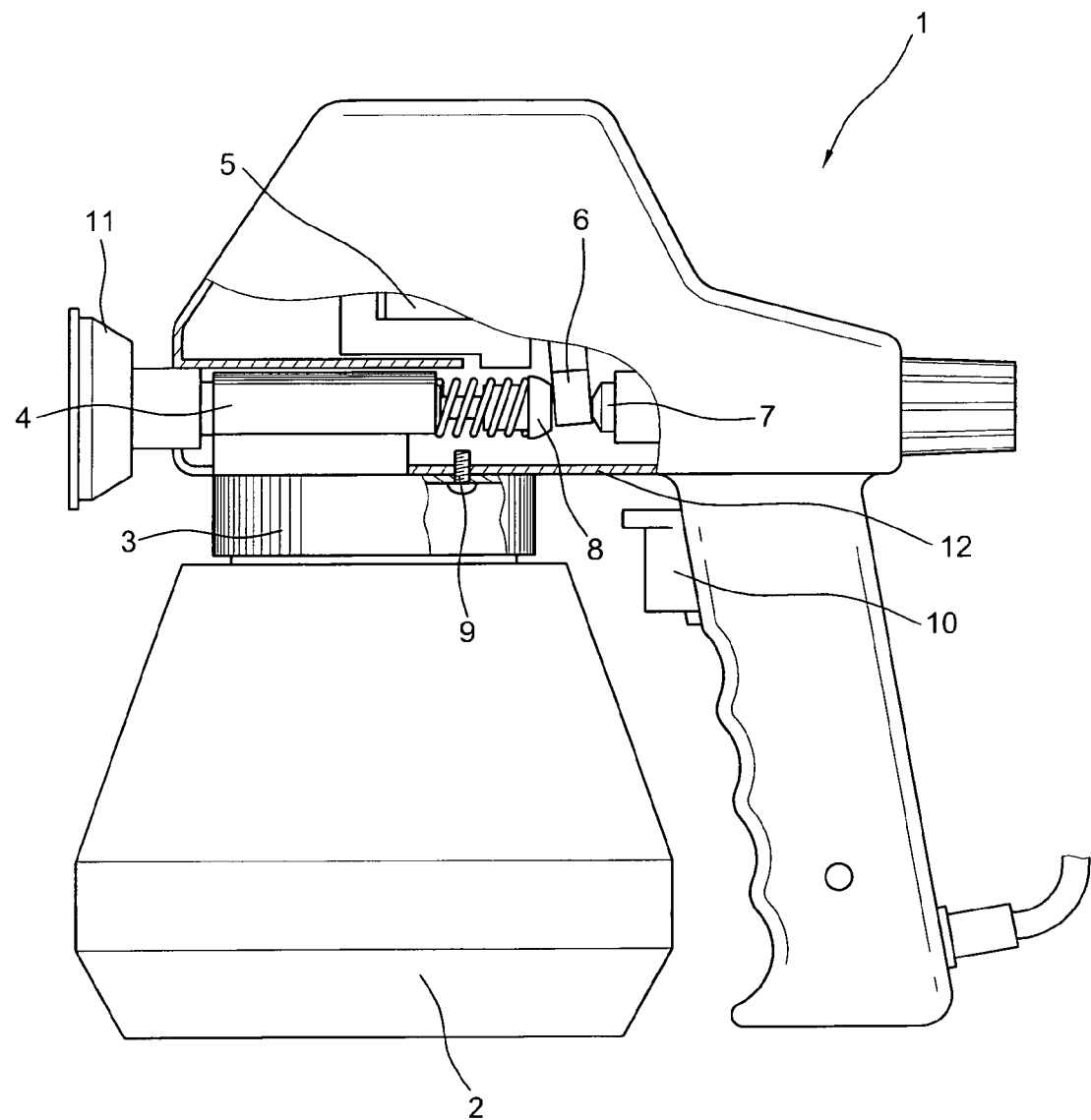
FIG. 1 is a partial side cross sectional view to show a conventional electric spray gun.
Figure 2:
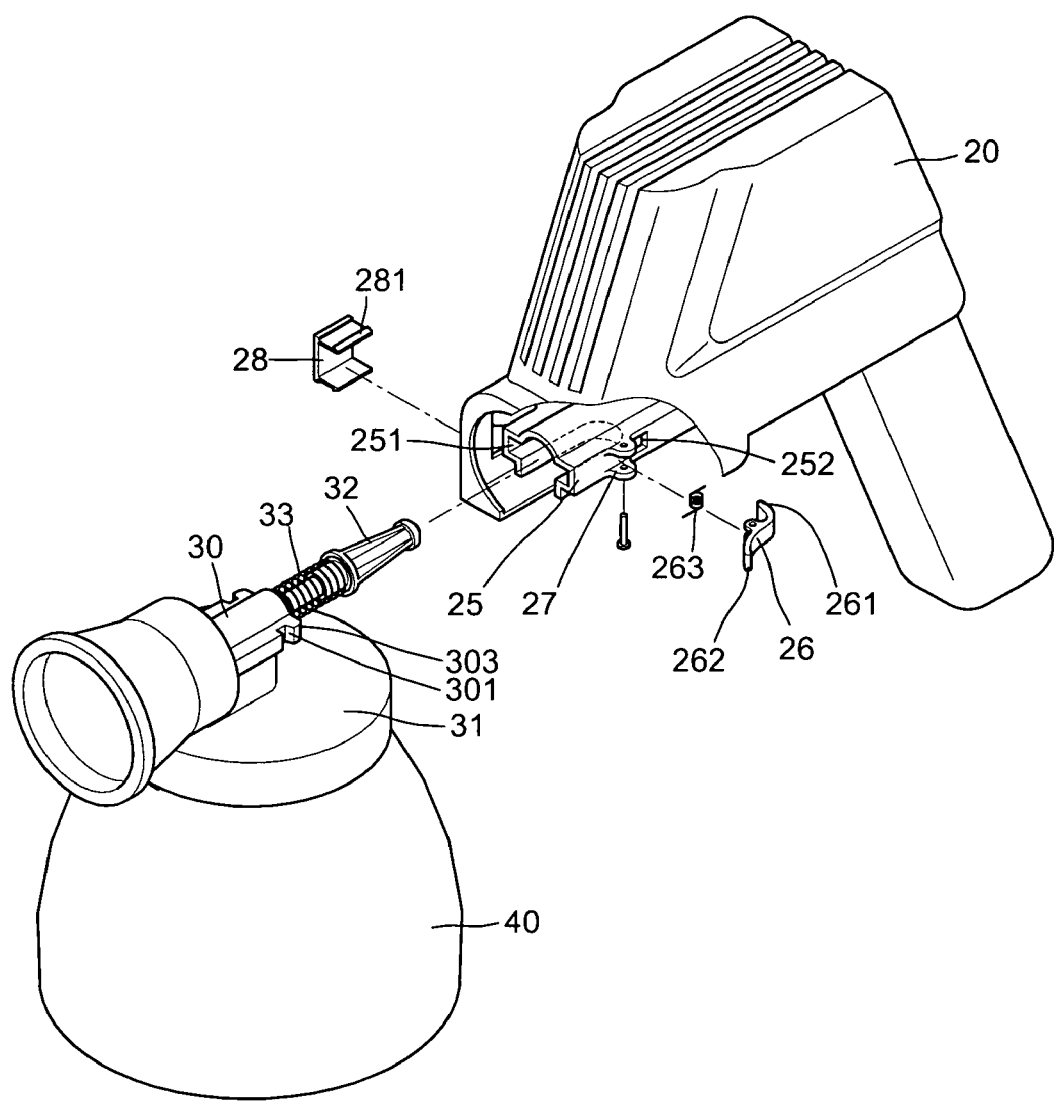
FIG. 2 is an exploded view to show the electric spray gun of the present invention.
Figure 3:
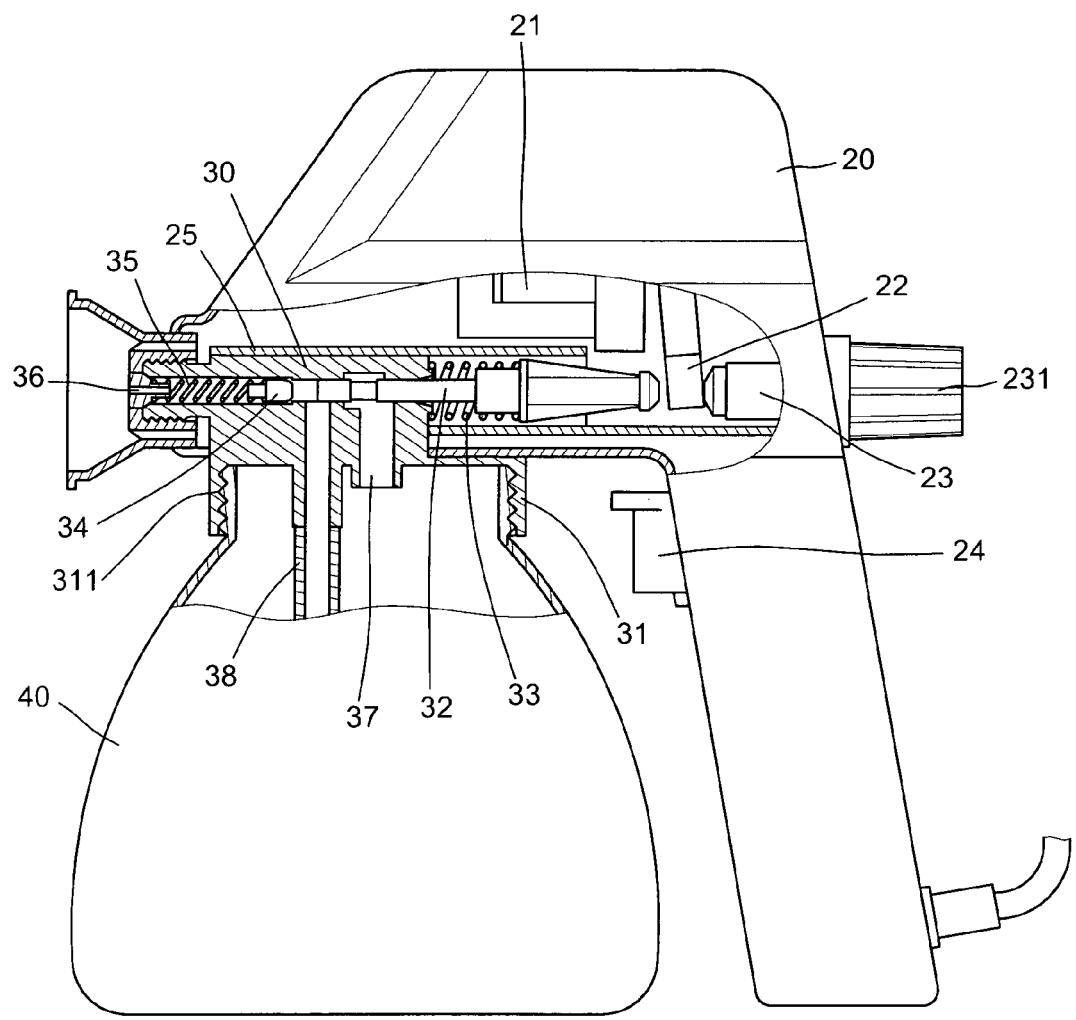
FIG. 3 is a partial side cross sectional view to show the electric spray gun of the present invention.
Figure 4:
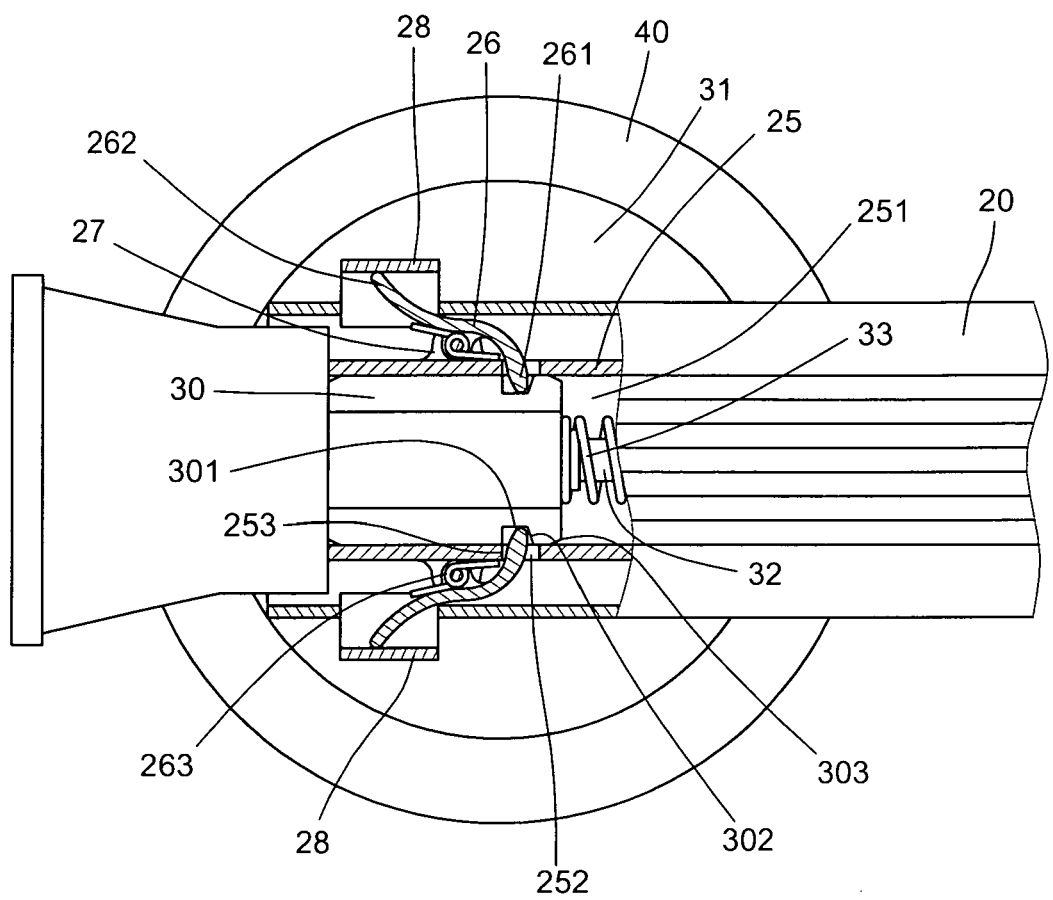
FIG. 4 is a partial top cross sectional view to show the electric spray gun of the present invention.
Figure 5:
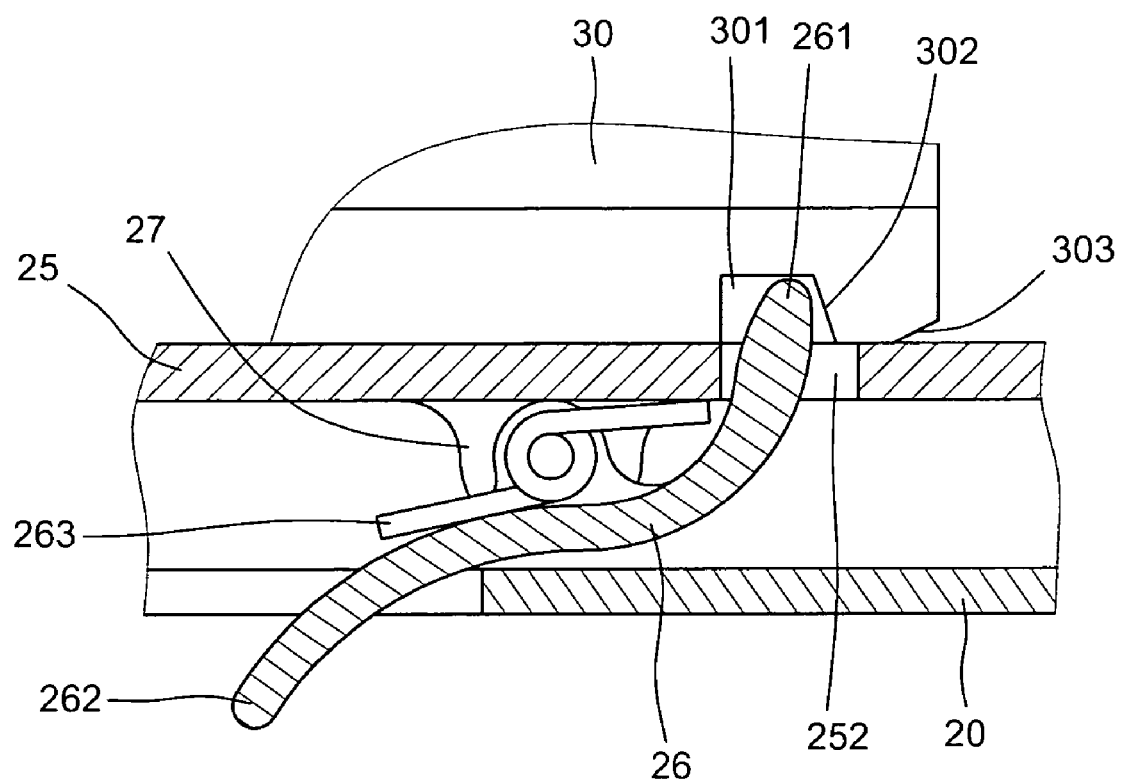
FIG. 5 is an enlarged cross sectional view to show the connection of the pawl, the positioning member and the cylinder.
Figure 6:
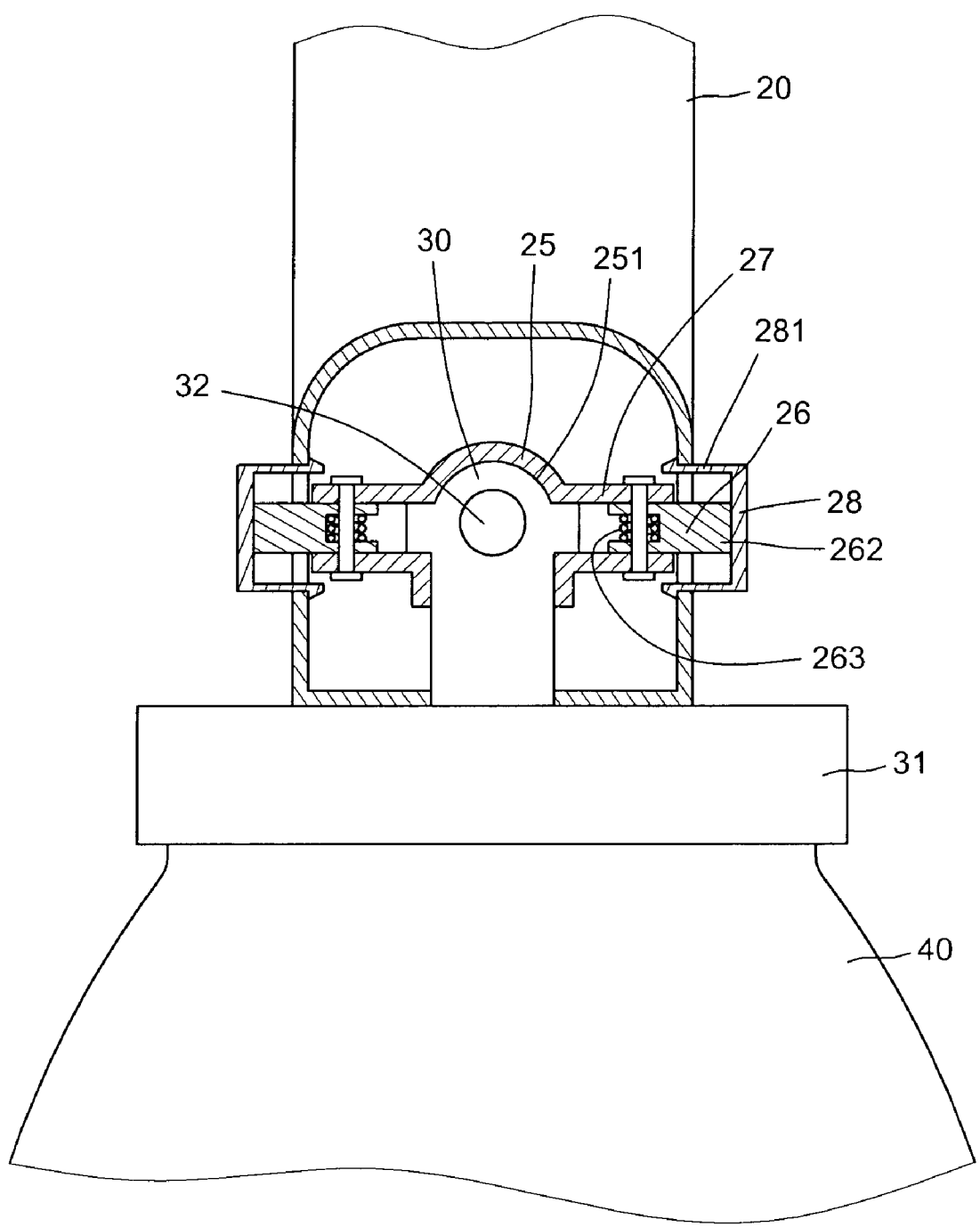
FIG. 6 is a front cross sectional view to show the connection of the buttons, the pawl, the positioning member and the cylinder.
Figure 7:
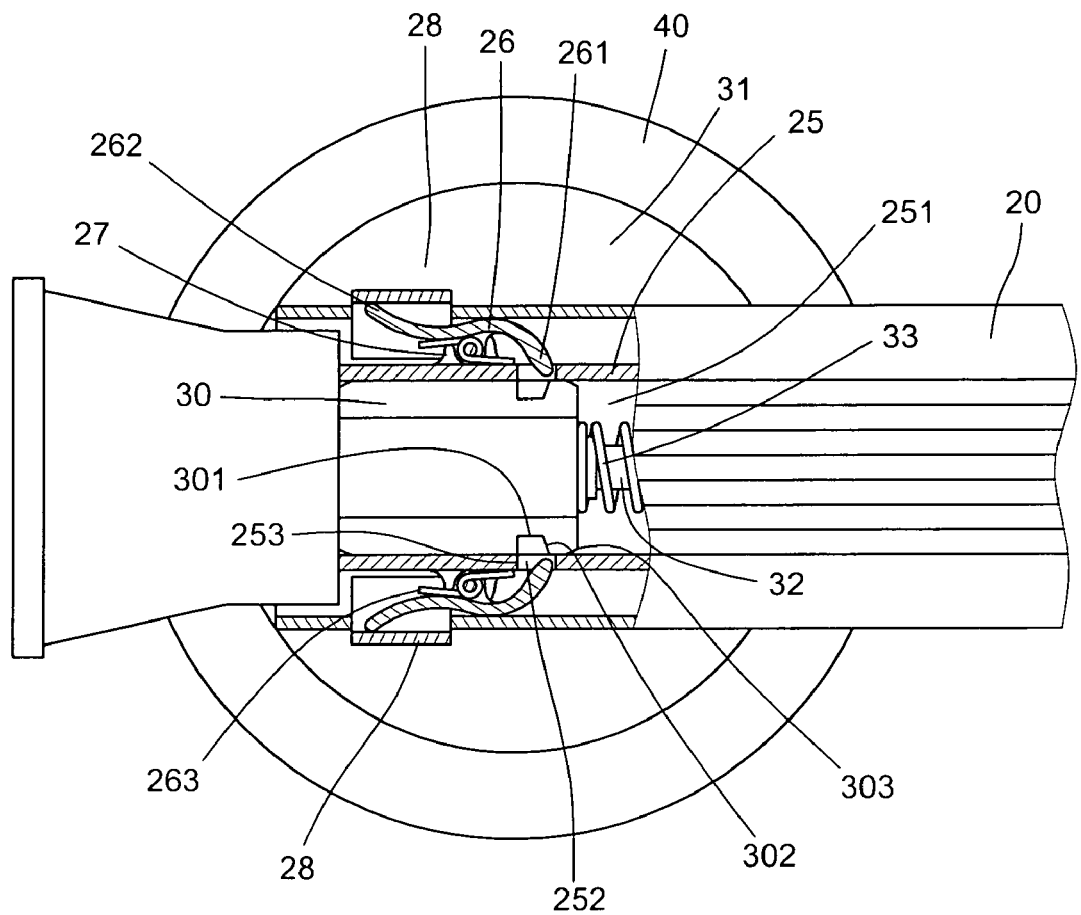
FIG. 7 is a top partial cross sectional view to show the connection of the pawl, the positioning member and the cylinder.

Referring to FIGS. 2 to 6, the electric spray gun of the present invention comprises a barrel 20 having an electro-magnetic unit 21 received therein and a positioning member 25 is located at a front end of the barrel. A handle is connected to the barrel and a trigger 24 is connected to the handle. The electro-magnetic unit 21 is activated by pulling the trigger 24 and the electro-magnetic unit 21 drives a swing rod 22 which can push a piston rod 32 of a cylinder 30 to be connected to the positinoign member 25. The positioning member 25 includes two guide slots 251 defined therein and two respective holes 252 are defined through two sidewalls of the positioning member 25 and communicate with the two guide slots 251. The distance that the piston rod 32 travels is adjusted by an adjustment member 23 which is located in the barrel so as to stop the swing rod 22. The adjustment member 23 can be adjusted by rotating the adjustment cap 231 located at the rear end of the barrel.

The cylinder 30 is fixedly connected with a cover 31 and a container 40 is removably and threadedly connected to teeth 311 defined in the cover 31. The piston rod 32 is movably inserted in the cylinder 30 and pushed by the swing rod 22. A spring 33 is mounted to the piston rod 32 so as to provide a force to return the piston rod 32. The cylinder 30 includes a one-way valve 34 received therein and a spring 35 biases the one-way valve 34. When the piston rod 32 is pushed by the swing rod 22 to suck the paint in the container 40 through a first path 38 defined through the cover 31, the one-way valve 34 is opened and the paint is ejected from the nozzle 36. After spraying, the spring 35 pushes the one-way valve 34 back and the surplus paint that is not sent out from the nozzle 36 flows back into the container 40 via a second path 38 defined through the cover 31.

Two recesses 301 are defined in two sides of the cylinder 30 and the two sides of the cylinder 30 are slidably engaged with the two guide slots 251 of the positioning member 25. The recesses 301 of the cylinder 30 are located corresponding to the holes 252 of the positioning member 25.

Two pairs of lugs 27 are connected to the two sidewalls of the positioning member 25 and two mediate portions of two pawls 26 are pivotably connected to the lugs 27. The two pawls 26 each include a first end 261 and a second end 262. The first end 261 of each of the two pawls 26 is a curved end. The first end 261 of each pawl 26 extends through the hole 252 and is engaged with the recess 301 corresponding thereto. Two torsion springs 263 are biased between the pawls 26 and the two sidewalls of the positioning member 25 so as to keep the first end 261 of each of the pawls 26 to be inserted into the recess 301. Each hole 252 of the positioning member 25 includes a first stop wall 253 and each recess 301 of the cylinder 30 includes a second stop wall 302. Two sides of the first end 261 of each pawl 26 are in contact with the first and second stop walls 253, 302. Two buttons 28 are movably connected to the barrel by inserting two insertions 281 of each button 28 into the barrel 20 and the two second ends 262 of the two pawls 26 are in contact with the two buttons 28. The cylinder 30 includes an inclined end 303 which can push the two respective first ends 261 of the two pawls 26 out from the recesses 301.

When connecting the cylinder 30 to the positioning member 25, the first ends 261 of the two pawls 26 are pushed outward by the inclined end 303 of the cylinder 30, the two pawls 26 are pivoted and the two first ends 261 are pivoted out from the recess 301. When the inclined end 303 move pass the through holes 252, the first ends 261 of the pawls 26 are inserted into the recesses 301 by the torsion springs 261. There is no tool required when connecting the cylinder 30.

When disengaging the cylinder 30 from the positioning member 25, the user simply presses the two buttons 28, the second end 262 of each of the pawls 26 is pressed and first end 261 of each of the pawls 26 is removed from the recesses 301 to allow the cylinder 30 to be slid out from the positioning member 25.

The cylinder 30 is easily to be connected to or removed from the barrel without using any tool. The connection between the positioning member 25 and the cylinder 30 is secured so that the container 40 does not shake during operation of the spray gun.

While we have shown and described the embodiment in accordance with the present invention, it should be clear to those skilled in the art that further embodiments may be made without departing from the scope of the present invention.

What is claimed is:

1. An electric spray gun comprising:
   a barrel having an electro-magnetic unit received therein and a positioning member located at a front end of the barrel, the positioning member including two guide slots defined therein and two respective holes defined through two sidewalls of the positioning member and communicating with the two guide slots, the electro-magnetic unit being controlled by a trigger and driving a swing rod;
   a cylinder fixedly connected with a cover and a container removably connected to the cover, a piston rod movably inserted in the cylinder and pushed by the swing rod so as to move reciprocally, two recesses defined in two sides of the cylinder and the two sides of the cylinder slidably engaged with the two guide slots of the positioning member, the recesses of the cylinder located corresponding to the holes of the positioning member, and
   two pawls pivotably connected to the two sidewalls of the positioning member, each pawl including a first end and a second end, the first end of each pawl extending through the hole and engaged with the recess corresponding thereto, the first end being pivoted out from the recess by pressing the second end of each of the pawls, two torsion springs biased between the two pawls and the positioning member respectively.

2. The spray gun as claimed in claim 1, wherein the first end of each of the two pawls is a curved end.

3. The spray gun as claimed in claim 1, wherein two pairs of lugs are connected to the two sidewalls of the positioning member and two mediate portions of the pawls are pivotably connected to the lugs.

4. The spray gun as claimed in claim 1, wherein each hole of the positioning member includes a first stop wall and each recess of the cylinder includes a second stop wall, two sides of the first end of each pawl are in contact with the first and second stop walls.

5. The spray gun as claimed in claim 1, wherein two buttons are movably connected to the barrel and the two second ends of the two pawls are in contact with the two buttons.

6. The spray gun as claimed in claim 1, wherein the cylinder includes a one-way valve received therein, a first path and a second path are defined through the cover and communicate with the container, an adjustment member is located in the barrel and the swing rod is stopped by the adjustment member when swing away from the piston rod.

7. The spray gun as claimed in claim 1, wherein the cylinder includes an inclined end which pushes the two respective first ends of the two pawls out from the recesses.

* * * * *